(12) United States Patent
Chopra et al.

(10) Patent No.: US 10,604,668 B2
(45) Date of Patent: Mar. 31, 2020

(54) SULFONATED POLYESTER INK

(71) Applicant: Xerox Corporation, Norwalk, CT (US)

(72) Inventors: Naveen Chopra, Oakville (CA); Rob Claridge, Gilford (CA); Biby Esther Abraham, Mississauga (CA); Carolyn Moorlag, Mississauga (CA); Jonathan Siu-Chung Lee, Oakville (CA); Guerino Sacripante, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 101 days.

(21) Appl. No.: 16/000,401

(22) Filed: Jun. 5, 2018

(65) Prior Publication Data

US 2019/0367754 A1 Dec. 5, 2019

(51) Int. Cl.
| | | |
|---|---|---|
| *C09D 11/04* | (2006.01) | |
| *C09D 11/104* | (2014.01) | |
| *C09D 11/101* | (2014.01) | |
| *B41M 1/06* | (2006.01) | |
| *C09D 11/033* | (2014.01) | |

(52) U.S. Cl.
CPC .......... *C09D 11/104* (2013.01); *C09D 11/101* (2013.01); *B41M 1/06* (2013.01); *C09D 11/033* (2013.01)

(58) Field of Classification Search
CPC ... C09D 11/104; C09D 11/101; C09D 11/033; B41M 1/06

USPC .................................................. 523/160, 161
See application file for complete search history.

(56) References Cited

U.S. PATENT DOCUMENTS

| | | | |
|---|---|---|---|
| 5,637,638 A | 6/1997 | Chandler et al. | |
| 5,700,851 A | 12/1997 | Banning et al. | |
| H2113 H * | 1/2005 | Nichols | C02C 17/00 523/160 |
| 7,312,011 B2 | 12/2007 | Patel et al. | |
| 9,592,699 B2 | 3/2017 | Stowe et al. | |
| 9,863,065 B2 | 1/2018 | Farrugia et al. | |
| 2003/0018100 A1* | 1/2003 | Foucher | C09D 11/104 523/160 |
| 2004/0061753 A1* | 4/2004 | Chen | B41M 5/0023 347/100 |
| 2016/0326390 A1* | 11/2016 | Farrugia | C08K 3/28 |

OTHER PUBLICATIONS

U.S. Appl. No. 13/095,714, filed Apr. 27, 2011.
U.S. Appl. No. 15/997,746, filed Jun. 5, 2018.
U.S. Appl. No. 15/997,753, filed Jun. 5, 2018.
U.S. Appl. No. 15/997,760, filed Jun. 5, 2018.
U.S. Appl. No. 15/997,770, filed Jun. 5, 2018.
U.S. Appl. No. 15/997,781, filed Jun. 5, 2018.
U.S. Appl. No. 15/886,381, filed Feb. 1, 2018.

* cited by examiner

*Primary Examiner* — Doris L Lee
(74) *Attorney, Agent, or Firm* — Pillsbury Winthrop Shaw Pittman LLP

(57) ABSTRACT

An aqueous ink composition including water, an optional co-solvent, a sulfonated polyester, and a polyurethane dispersion, and process of making thereof.

17 Claims, 5 Drawing Sheets

SULFONATED POLYESTER INK

FIELD OF THE INVENTION

The present disclosure relates to ink compositions containing sulfopolyester particles and polyurethane dispersion additives. More specifically, the ink compositions are suitable for use in offset lithography (or offset printing). In embodiments, the ink compositions are suitable for use in digital offset lithography.

BACKGROUND

Lithography is common for use in digital label press and packaging printing. In the offset process, the image may be indirectly applied to the media, such as paper or other materials, through an intermediate transfer, or blanket cylinder, whereby the image from the plate is applied first to a blanket cylinder, which then offsets, or transfers, from the blanket cylinder to the media. Typical lithographic and offset printing techniques utilize plates that are permanently patterned, and are, therefore, useful only when printing a large number of copies of the same image, such as magazines, newspapers, and the like.

Digital offset lithographic printing has been developed as a system that uses a non-patterned re-imageable surface, which is initially uniformly coated with a dampening fluid layer. Regions of the dampening fluid are removed by exposure to a focused radiation source (e.g., a laser light source) to form pockets. A temporary pattern in the dampening fluid is thereby formed over the non-patterned re-imageable surface. The digital offset-type ink applied thereover is retained in the pockets formed by the removal of the dampening fluid. The inked surface is then brought into contact with a substrate, such as paper, plastic or metal and the ink transfers from the pockets in the dampening fluid layer to the substrate. The dampening fluid may then be removed, a new uniform layer of dampening fluid applied to the re-imageable surface, and the process repeated. For example, an inker subsystem may be used to apply a uniform layer of digital offset-type ink over the layer of dampening fluid. The inker subsystem may use an anilox roller to meter the ink onto one or more ink forming rollers that are in contact with the re-imageable surface.

Digital offset lithographic printing systems use offset-type inks that are specifically designed and optimized to be compatible with the materials the ink is in contact with, including the re-imageable surface and the dampening solution as well as with the various subsystems used during the printing process to enable high quality digital printing at high speed.

Digital offset printing inks differ from conventional inks because they must meet demanding rheological requirements imposed by the lithographic printing process while being compatible with system component materials and meeting the functional requirements of sub-system components, including wetting and transfer. Print process studies have demonstrated that higher viscosity is preferred for ink transfer to digital lithography imaging blanket from the inker unit via a roll and yet even higher viscosity is needed to improve transfer to a print substrate.

Accordingly, digital offset inks require a specific range of viscosity, tack and tack stability to afford sufficient and predictable ink cohesion to enable good transfer properties in and among the various subsystems.

Currently, only few examples of digital offset-type ink are commercially available. These examples include UV curable inkjet types and hot-melt adhesive dispensers, such as, those from Nordson or Marco.

Therefore, there remains a need for digital advanced lithography imaging inks to have increased viscosity latitude to enable excellent ink transfer from the ink loader system at both about 60° C. and excellent ink delivery from the anilox roller to the fluorosilicone blanket at temperatures as low as about 20° C.

SUMMARY

According to embodiments illustrated herein, there is provided an ink composition comprising water; an optional co-solvent; a sulfonated polyester having a degree of sulfonation of from about 3.5 mole percent to about 7.5 mole percent; and a polyurethane dispersion.

In certain embodiments, there is provided a process for digital offset printing, the process comprising: applying an ink composition onto a re-imageable imaging member surface at an ink take up temperature, the re-imageable imaging member having dampening fluid disposed thereon; forming an ink image; and transferring the ink image from the re-imageable surface of the imaging member to a printable substrate at an ink transfer temperature; wherein the ink composition comprises: water; an optional co-solvent; a sulfonated polyester; and a polyurethane dispersion.

BRIEF DESCRIPTION OF THE DRAWINGS

For a better understanding of the present embodiments, reference may be made to the accompanying figures.

DETAILED DESCRIPTION

Figure 1:
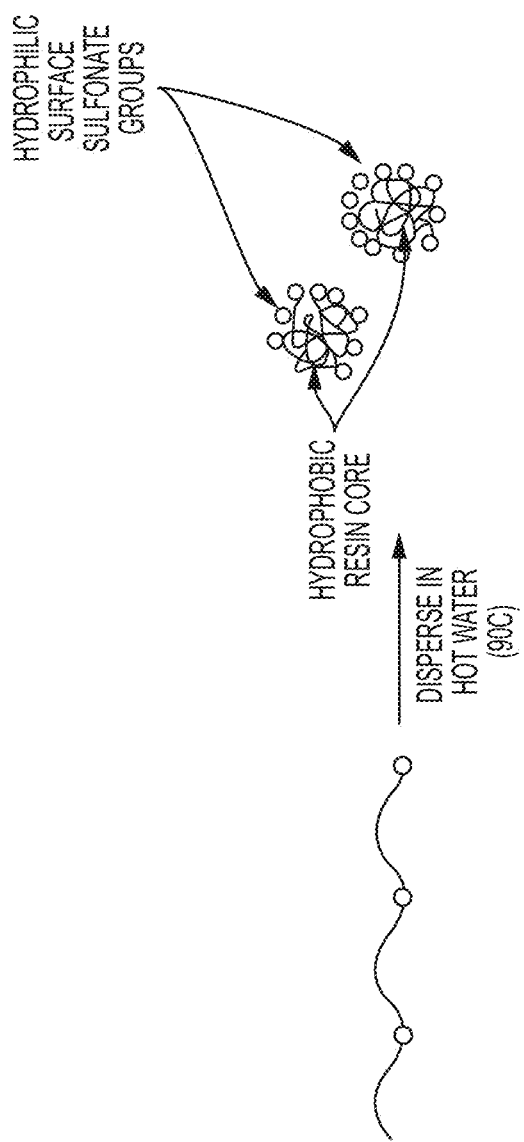
FIG. 1 illustrates a schematic representation of a related art ink-based variable image digital printing system with which the ink compositions according to this disclosure may be used.
Figure 2:
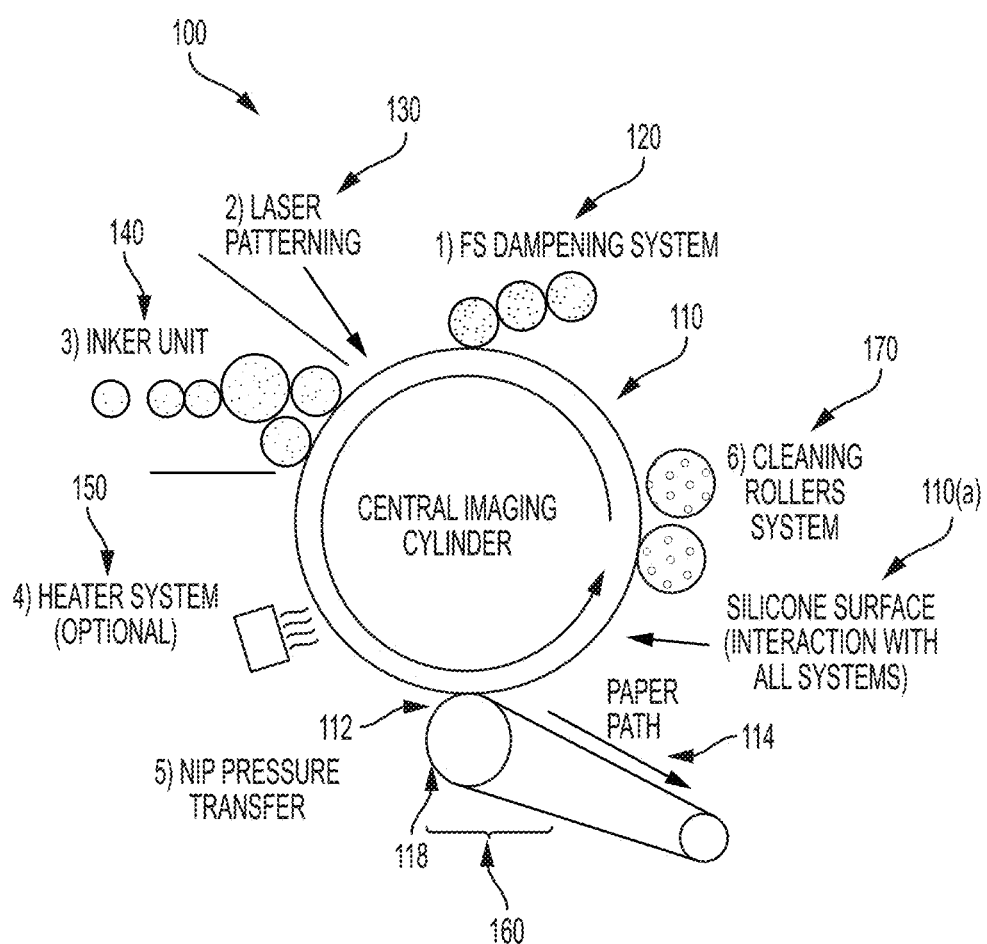
FIG. 2 shows a schematic representation of a method for preparing sulfonated polyester latex materials.

In the following description, it is understood that other embodiments may be utilized and structural and operational changes may be made without departure from the scope of the present embodiments disclosed herein.

Disclosed herein is an ink composition (or "ink") including a sulfonated polyester with at least 3.5 weight percent sulfonation and a polyurethane dispersion (PUD). In embodiments, the degree of sulfonation in the sulfonated polyester may be ranged between about 3.5 and about 7.5 mole percent (i.e., with an amount of sulfonation of between about 3.5 and about 7.0 mole % by of the sulfonated polyester), between about 4 and about 10, between about 5 and about 9, or between about 6 and about 8 mole percent. The sulfonation in measured in mole percent refers to the percentage of moles of sulfonated monomer present in the final sulfonated polyester resin. For example, the sulfonation of a sulfonated polyester containing the monomer Dimethyl-5-Sulfoisophthalate Sodium Salt (DMSIP) can be calculated as follows: (moles DMSIP (Dimethyl-5-Sulfoisophthalate Sodium Salt) charged/(total moles charged less excess moles glycol)×100%.

The use of a sulfonated polyester having a higher degree of sulfonation, such as at least 7.5 mol percent in the ink compositions, permits a higher sulfonated polyester content in the ink composition (i.e., a higher solid loading of sulfonated polyester). The solids loading of sulfonated polyester may be ranged from between about 25 to about 50, between about 30 to about 45, or between about 35 to about 40. The term "solids loading" used herein, which is interchangeably with the term "weight percent solids" refers to the sulfonated polyester weight percent in water.

In embodiments, the sulfonated polyester is water-dissipatible. Typically, when a polymer is self-dissipatible, it means that the polymer can be dispersed in water without the need for additional surfactants. The term "water-dissipatible" is used interchangeably with other terms such as "water-dispersible," or "water-soluble." The term refers to the activity of a water or aqueous solution on the sulfonated polyesters described herein. The term covers situations, including where the sulfonated polyesters dissolved to form a true solution or is dispersed within an aqueous medium. The particle size is a function of the degree of sulfonation. For example, sulfonated polyesters with lower degree of sulfonation (3.5 mole percent or less) do not dissolve in water readily, the solubility of these sulfonated polyesters with lower degree of sulfonation in water is typically less than 10 weight percent based on the total weight of the sulfonated polyesters, thus causing the phenomena of water cloudiness, and the resulting sulfonated polyester particle size of greater than 100 nm. In contrast, the present disclosure provide sulfonated polyester with a higher degree of sulfonation, which dissolve readily in water, thus resulting a clear polymer solution, and the resulting sulfonated polyester particle size is in a desirable range of less than 50 nm.

The sulfonated polyester can be simultaneously synthesized during the self-assembly or dispersing of polymer in water as indicated in FIG. 1. Referring to FIG. 1, the sulfonated polyester is dispersed in water, for example at a temperature of about 90° C., providing a hydrophobic resin core and hydrophilic surface sulfonate groups.

In embodiments, the ink composition of the disclosure is substantially free of pigment. The term "substantially free of pigment" and "pigment-free", as used herein in reference to inks, means no pigment or a very small amount of pigment is presented, for example, less than 5% by weight of the total weight of the ink composition, such as from about 0% to less than 5%, from about 0% to about 2%, from about 0% to about 1%, from about 0% to about 0.5%, or from about 0% to about 0.2%.

Typically, when a substantial amount of pigments is removed from an ink, for example, an aqueous ink, or a solvent-based ink, the ink may become watery, having a low viscosity, such as from about 2 to about 100 cps, at 25° C., and thus causing poor ink transfer and cohesion. There exists a challenge for ink compositions that are substantially free of pigment, and to incorporate an adhesive, such as polyurethane dispersions (PUDs) into the ink compositions. Polyurethane dispersions are typically used in ink compositions to provide good extrusion and adhesive properties. The ink herein containing PUD as an additive to enable full ink transfer (i.e., 100% ink transfer, or substantially close to 100% ink transfer, e.g., at least 90%, at least 95%, or at least 99% ink transfer) from a transfer substrate, e.g., from the central imaging cylinder. The PUD also serves the purpose of preserving the adhesiveness characteristic of the ink, especially of the pigment-free ink. The inclusion of a sulfonated polyester in the ink composition is critical to enable the formulation of PUD into the ink composition. Using a water-dissipatible polymer may increase the compatibility of PUD within an aqueous ink, as the materials are less likely to phase-separate. Furthermore, the PUD is essential for the adhesiveness property. The sulfonated polyester polymer on its own gives a brittle film when drying, and lacks the adhesive 'sticky' property.

The ink composition of the disclosure herein may be used for any suitable or desired purpose. In embodiments, the ink composition is particularly suitable for digital offset printing, in embodiments, for printing labels, packaging, and in particular, for food grade and medical grade printing. In embodiments, the ink herein is suitable for use as an undercoat in a printing process.

Sulfonated Polyesters

In embodiments, the sulfonated polyesters of the present disclosure can be prepared from the polymerization reaction of at least one diacid monomer or at least one diester monomer, and at least one alkali sulfonated difunctional monomer. In embodiments, the sulfonated polyesters of the present disclosure can be prepared from the reaction of at least one diacid monomer or at least one diester monomer, and at least one alkali sulfonated difunctional, and at least one diol monomer.

The term "diacid" used herein, refers to compounds containing dicarboxylic acids or the source compounds of the dicarboxylic acids derived from (i.e., acid anhydrides or esters of the diacid). Examples of diacid include dicarboxylic acids of terephthalic acid, phthalic acid, isophthalic acid, fumaric acid, maleic acid, succinic acid, itaconic acid, succinic acid, succinic anhydride, dodecenylsuccinic acid, dodecenylsuccinic anhydride (DDSA), glutaric acid, glutaric anhydride, adipic acid, pimelic acid, suberic acid, azelic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and mixtures thereof. The term "diesters" used herein, refers to esters of the diacids used herein, where the alkyl groups of the diesters (the carbon group of the diol) may contain from 2 to about 10 carbon atoms, which may be branched or unbranched.

The diacid or diester used in the preparation of the sulfonated polyester may be from about 40 to about 48, from about 43 to about 45, or from about 42.5 to about 46.5 mole percent, based on the total weight of the sulfonated polyester.

Alkali sulfonated difunctional monomer examples, wherein the alkali is lithium, sodium, or potassium, and in particular embodiments wherein the alkali is sodium, include dimethyl-5-sulfo-isophthalate, dialkyl-5-sulfoisophthalate-4-sulfo-1,8-naphthalic anhydride, 4-sulfophthalic acid, 4-sulfophenyl-3,5-dicarbomethoxybenzene, 6-sulfo-2-naphthyl-3,5-dicarbomethoxybenzene, sulfo-terephthalic acid, dimethyl-sulfo-terephthalate, dialkyl-sulfo-terephthalate, sulfo-ethanediol, 2-sulfo-propanediol, 2-sulfo-butanediol, 3-sulfo-pentanediol, 2-sulfo-hexanediol, 3-sulfo-2-methylpentanediol, N,N-bis(2-hydroxyethyl)-2-aminoethane sulfonate, 2-sulfo-3,3-dimethylpentanediol, sulfo-p-hydroxybenzoic acid, mixtures thereof, and the like. The alkali sulfonated difunctional monomer used in the preparation of the sulfonated polyester may be from about 3.0 to about 7.5 mole percent in embodiments, from about 4 to about 10, from about 5 to about 9, or from about 6 to about 8 mole percent.

Examples of diols utilized in generating the sulfonated polyester include, but are not limited to, 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hyroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and mixtures thereof. The diol used in the preparation of the sulfonated polyester may be from about 40 to about 48, from about 43 to about 45, or from about 42.5 to about 46.5 mole percent based on the total weight of the sulfonated polyester. In embodiments, an extra amount (or excess amount) of diol may be used to drive the reaction to completion, where the excess amount of diol is then distilled off or removed.

In embodiments, after polymerization, the resulting sulfonated polyesters may comprise an aryl unit, a sulfonated unit, and a aliphatic unit having the following formulae:

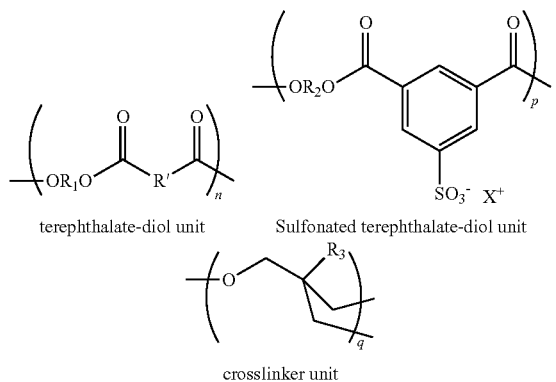

terephthalate-diol unit   Sulfonated terephthalate-diol unit crosslinker unit where each $R_1$ and each $R_2$ may be independently an alkylene of, for example, from 2 to about 25 carbon atoms such as ethylene, propylene, butylene, oxyalkylene diethyleneoxide, and the like; each $R_3$ may be independently an alkyl group of, for example, from 1 to 15 carbon atoms, branched or unbranched, such as, methyl, ethyl, propyl, isopropyl, butyl, and the like; each R' may be independently an arylene of, for example, from about 6 to about 36 carbon atoms, such as a benzylene, bisphenylene, bis(alkyloxy) bisphenolene, and the like; each $X^+$ may be independently $Na^+$, $Li_+$, $K_+$, and the like; and each n, each p and each q represent the number of randomly repeating segments, each of which may be independently from about 10 to about 100,000. In embodiments, n is from about 40 to about 50 mol percent, from about 42.5 to about 46.5 mol percent, or from about 43 to about 45 mol percent. In embodiments, p is from about 7.5 to about 15 mol %, from about 8 to about 12 mol percent. In embodiments, q is from about 0.1 to about 4 mol percent, 0.1 to about 2.5 mol percent, from about 0.2 to about 1.5. p represents the amount of sulfonation in the sulfonated polyester. q represents the amount of crosslinker in the sulfonated polyester. n is 100−(p+q).

The sulfonated polyesters may include a random combination of at least one optionally repeating aryl unit, at least one optionally repeating sulfonated unit, at least one optionally repeating aliphatic unit.

In embodiments, the sulfonated polyesters may have the following general structure, or random copolymers thereof in which the n and p segments are separate:

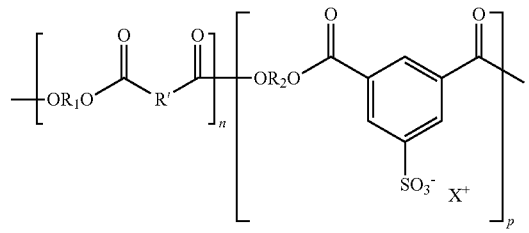

wherein $R_1$, $R_2$, R', X, n and p are defined herein.

In embodiments, the sulfonated polyester may have the following general

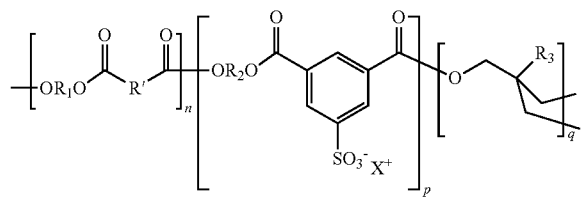

wherein $R_1$, $R_2$, R', X, n, p, and q are defined herein.

Examples of the sulfonated polyesters further include those disclosed in U.S. Pat. No. 7,312,011 which is incorporated herein by reference in its entirety.

In embodiments, the sulfonated polyesters is amorphous. In embodiments, the amorphous sulfonated polyesters can be hydrogen or a salt of a random sulfonated polyester of poly(1,2-propylene-5-sulfoisophthalate), poly(neopentylene-5-sulfoisophthalate), poly(diethylene-5-sulfoisophthalate), copoly(1,2-propylene-5-sulfoisophthalate)-copoly-(1,2-propylene-terephthalate phthalate), copoly(1,2-propylene-diethylene-5-sulfoisophthalate)-copoly-(1,2-propylene-diethylene-terephthalate phthalate), copoly(ethylene-neopentylene-5-sulfoisophthalate)-copoly-(ethylene-neopentylene-terephthalate-phthalate), copoly(propoxylated bisphenol A)-copoly-(propoxylated bisphenol A-5-sulfoisophthalate), copoly(ethylene-terephthalate)-copoly-(ethylene-5-sulfo-isophthalate), copoly(propylene-terephthalate)-copoly-(propylene-5-sulfo-isophthalate), copoly(diethylene-terephthalate)-copoly-(diethylene-5-sulfo-isophthalate), copoly(propylene-diethylene-terephthalate)-copoly-(propylene-diethylene-5-sulfoisophthalate), copoly(propylene-butylene-terephthalate)-copoly(propylene-butylene-5-sulfo-isophthalate), copoly(propoxylated bisphenol-A-fumarate)-copoly(propoxylated bisphenol A-5-sulfo-isophthalate), copoly(ethoxylated bisphenol-A-fumarate)-copoly(ethoxylated bisphenol-A-5-sulfo-isophthalate), copoly(ethoxylated bisphenol-A-maleate)-copoly(ethoxylated bisphenol-A-5-sulfo-isophthalate), copoly(propylene-diethylene terephthalate)-copoly(propylene-5-sulfoisophthalate), copoly(neopentyl-terephthalate)-copoly-(neopentyl-5-sulfoisophthalate), and the like, as well as mixtures thereof.

The salts of the random amorphous sulfonated polyesters of the present embodiments may include salts of alkali metals, such as sodium, lithium, and potassium; salts of alkaline earth metals, such as beryllium, magnesium, calcium, and barium; metal salts of transition metals, such as vanadium, iron, cobalt, copper; metal salts, such as aluminum salts, and the like, as well as mixtures thereof.

In embodiments, the sulfonated polyester matrix is a branched polymer. In embodiments, the sulfonated polyester matrix is a linear polymer. The selection of branched or linear polymer may depend on, inter alia, the downstream application of the composite product. Linear polymers can be used to create strands of fibers or form a strong mesh-like structure. Branched polymers may be useful to confer thermoplastic properties on the resultant composite material.

The linear sulfonated polyester are generally prepared by the polycondensation of an organic diol and a diacid or diester, at least one of which is sulfonated or a sulfonated difunctional monomer being included in the reaction, and a polycondensation catalyst. For the branched sulfonated polyester, the same materials may be used, with the further inclusion of a branching agent such as a multivalent polyacid or polyol. Branching agents for use in forming the branched amorphouG sulfonated polyester include, for example, a multivalent polyacid such as 1,2,4-benzenetricarboxylic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,3-dicarboxyl-2-methyl-2-methylene-carboxylpropane, tetra (methylene-carboxyl)methane, and 1,2,7,8-octanetetracarboxylic acid, acid anhydrides thereof, and lower alkyl esters thereof, 1 to about 6 carbon atoms; a multivalent polyol such as sorbitol, 1,2,3,6-hexanetetrol, 1,4-sorbitane, pentaerythritol, dipentaerythritol, tripentaerythritol, sucrose, 1,2,4-butanetriol, 1,2,5-pentatriol, glycerol, 2-methylpropanetriol, 2-methyl-1,2,4-butanetriol, trimethylolethane, trimethylolpropane, 1,3,5-trihydroxymethylbenzene, mixtures thereof, and the like. The branching agent amount selected is, for example, from about 0.1 to about 5 mole percent of the sulfonated polyester.

The polycondensation may be carried out under acidic conditions.

The polycondensation may be carried out in the presence of a catalyst. In embodiments, the catalyst employed in the polyesterification reaction is tin-based. Such catalysts may be based on tin (II) or tin (IV) oxidation states. In embodiments, the tin-based catalyst are mono-, di-, or tetraalkyl tin-based. Examples of tin-based catalyst include tetraalkyl titanates, dialkyltin oxide such as dibutyltin oxide, tetraalkyltin such as dibutyltin dilaurate, dialkyltin oxide hydroxide such as butyltin oxide hydroxide, aluminum alkoxides, alkyl zinc, dialkyl zinc, zinc oxide, stannous oxide, or mixtures thereof. In embodiments, monoalkyl tin compounds may further comprise oxide and/or hydroxide groups attached to the tin atom. In embodiments, the tin-based catalyst comprises a mixture of monobutyltin oxide, monobutyltin hydroxide oxide, and butyl stannoic acid, commercially available as FASCAT® 4100. Other tin-based catalysts employed in transesterification chemistry are well-known in the art and can be used as well to prepare the sulfonated polyesters herein. The amount of catalysts used herein may be from about 0.01 mole percent to about 5 mole percent based on the starting amount of diacid or diester used to generate the sulfonated polyesters.

The sulfonated polyesters suitable for use in the present disclosure may have a glass transition (Tg) temperature of from about 45° C. to about 95° C., or from about 52° C. to about 70° C., as measured by the Differential Scanning calorimeter. The sulfonated polyesters may have a number average molecular weight of from about 2,000 g per mole to about 150,000 g per mole, from about 3,000 g per mole to about 50,000 g per mole, or from about 6,000 g per mole to about 15,000 g per mole, as measured by the Gel Permeation Chromatograph. The sulfonated polyesters may have a weight average molecular weight of from about 3,000 g per mole to about 300,000 g per mole, from about 8,000 g per mole to about 90,000 g per mole, or from about 10,000 g per mole to about 60,000 g per mole, as measured by the Gel Permeation Chromatograph. The sulfonated polyesters may have a polydispersity of from about 1.6 to about 100, from about 2.0 to about 50, or from about 5.0 to about 30, as calculated by the ratio of the weight average to number average molecular weight.

In embodiments, the sulfonated polyester has a particle size in a range of from about 5 nanometers (nm) to about 55 nm, from about 10 to about 45 nm, or from about 20 to about 30 nm. A particle size of less than 5 nm may be useful for reinforcement of polymer matrices without disturbing transparency and other properties of coatings.

In embodiments, the sulfonated polyester has a particle size of from about 5 nanometers to about 55 nanometers. In further embodiments, the polyester has a particle size of from about 10 nanometers to about 15 nanometers. As used herein, references to "particle size" will generally refer to $D_{50}$ mass-median-diameter (MMD) or the log-normal distribution mass median diameter. The MMD is considered to be the average particle diameter by mass.

In embodiments, there are provided methods comprising heating a sulfonated polyester resin in water, thereby forming an emulsion of composite particles comprising a sulfonated polyester.

In embodiments, heating is conducted at a temperature of from about 65° C. to about 90° C.

In certain embodiments, a method herein comprises heating a sulfonated polyester resin in water, wherein the sodium sulfonated polyester has a degree of sulfonation of from about 3.5 weight percent to about 12 weight percent; and forming an emulsion of particles comprising the sulfonated polyester. In embodiments, the method further comprises combining the polyester particles with water, an optional co-solvent, and a polyurethane dispersion to form an aqueous ink composition.

The ink of the present disclosure may contain from about 10 to about 60 weight percent, from about 20 to about 50 weight percent, or from about 35 to about 45 weight percent, of the sulfonated polyester based on the total weight of the ink.

Polyurethane (PUD)

The ink composition of the disclosure also includes a polyurethane dispersion (PUD). As used herein, the term "PUD" means the polyurethanes dispersions described herein. As used herein, the term "dispersion" means a two phase system where one phase consists of finely divided particles (often in the colloidal size range) distributed throughout a bulk substance, the particles being the dispersed or internal phase and the bulk substance the continuous or external phase. The bulk system is often an aqueous system.

The polyurethane dispersion of the present disclosure can be prepared from the reaction product of: (a) a urethane prepolymer, the urethane prepolymer being a catalyzed reaction product of: (i) a polyol; (ii) a polyisocyanate; and (iii) an internal surfactant; (b) a neutralizing agent; and (c) a chain extender.

Polyurethane dispersions (PUDs) have been employed as carriers in aqueous ink jet inks, for example, U.S. Pat. No. 5,700,851, and aqueous writing inks, for example, U.S. Pat. No. 5,637,638, which are both hereby incorporated by reference.

Commercial examples of PUD can include, for example, U410 and U615 obtained from Alberdingk; U355 obtained from Bayhydrol; U2757, UH420, UH2558, UXP2698, UXP2755, UA2586 XP, UHXP2648 and UH2952/1 obtained from Covestro; and DL1380 and DL1537 obtained from Impranil, or obtained from Covestro.

The ink of the present disclosure may contain from about 2 to about 40 weight percent, from about 5 to about 30 weight percent, or from about 10 to about 20 weight percent, of the polyurethane dispersion based on the total weight of the ink.

The ink compositions herein may include an ink vehicle, which may consist solely of water, or may include a mixture of water and a co-solvent. Examples of co-solvent include alcohols and alcohol derivatives, such as, aliphatic alcohols, aromatic alcohols, dials, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxyproponic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, diethylene glycol, N-methylpyrrolidone, methoxylated glycerol, ethoxylated glycerol, sulfolane, methyl ethyl ketone, isopropanol, 2-pyrrolidinone, polyethylene glycol, and mixtures thereof. In embodiments, the co-solvent includes sulfolane. In embodiments, the co-solvent includes diethylene glycol.

The ink of the present disclosure may contain from about 0 to about 40 weight percent, from about 5 to about 30 weight percent, or from about 10 to about 20 weight percent, of the co-solvent based on the total weight of the ink.

When mixtures of water and water soluble or miscible organic solvent liquids are selected as the ink vehicle, the water to co-solvent ratio ranges can be any suitable or desired ratio, in embodiments from about 100:0 to about 30:70, or from about 97:3 to about 40:60, or from about 95:5 to about 60:40. The co-solvent generally serves as a humectant or a solvent, which has a boiling point higher than that of water (100° C.). The co-solvent may be soluble in water, or may be miscible with water without phase separation. The co-solvent may have a polarity that is compatible with water. The organic component of the ink vehicle can also serve to modify ink surface tension, modify ink viscosity, dissolve or disperse the colorant, and/or affect the drying characteristics of the ink. In embodiments, the ink is more attracted to paper substrates than plastic media as in solvent-based inks.

The water soluble or water miscible organics which are used in the ink formulation can help with surface tension, drying, leveling, etc. In embodiments, water makes up over 50% of the formulation, in embodiments water comprises from about 55 to about 85%, from about 55 to about 80%, or from about 60 to about 70% of the ink composition. Thus, the ink compositions herein are mainly aqueous.

The total amount of ink vehicle can be provided in any suitable or desired amount. In embodiments, the ink vehicle is present in the ink composition in an amount of from about 75 to about 97 percent, or from about 80 to about 95 percent, or from about 85 to about 95 percent, by weight, based on the total weight of the ink composition.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL C0-720™, IGEPAL C0-290™, IGEPAL CA-21O™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Sigma-Aldrich, NEOGEN R™, NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount, in embodiments, the surfactant is present in an amount of from about 0.01 to about 5 percent by weight, based on the total weight of the ink composition. It should be noted that the surfactants are named as dispersants in some cases.

The ink composition can further comprise additives. Optional additives that can be included in the ink compositions include biocides, fungicides, pH controlling agents such as acids or bases, phosphate salts, carboxylates salts, sulfite salts, amine salts, buffer solutions, and the like, sequestering agents such as EDTA (ethylenediamine tetra acetic acid), viscosity modifiers, leveling agents, and the like, as well as mixtures thereof.

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In embodiments, a process herein comprises combining a sulfonated polyester, a polyurethane, water, an optional co-solvent, and an optional surfactant to form an aqueous ink composition.

In a specific embodiment, the inks are prepared as follows: 1) preparation of a sulfonated polyester; 2) preparation of a polyurethane dispersion (PUD); 3) mixing of the sulfonated polyester with PUD, optional co-solvent, and optional surfactant.

In embodiments, the ink has a viscosity of from about has a viscosity of from about $1\times10^6$ cps to about $1\times10^8$ cps, for example from about $1\times10^{6.5}$ cps to about $1\times10^{7.5}$ cps, at the temperature of 25° C. As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES mechanical spectrometer, both made by Rheometrics, a division of TA Instruments.

An exemplary digital offset printing architecture is shown in FIG. 1. As seen in FIG. 1, an exemplary system 100 may include an imaging member 110. The imaging member 110 in the embodiment shown in FIG. 1 is a drum, but this exemplary depiction should not be interpreted so as to exclude embodiments wherein the imaging member 110 includes a plate or a belt, or another now known or later developed configuration. The re-imageable surface 110(a) may be formed of materials including, for example, a class of materials commonly referred to as silicones, including flurosilicone, among others. The re-imageable surface may be formed of a relatively thin layer over a mounting layer, a thickness of the relatively thin layer being selected to balance printing or marking performance, durability and manufacturability.

U.S. patent application Ser. No. 13/095,714 ("714 Application"), entitled "Variable Data Lithography System," filed on Apr. 27, 2011, by Timothy Stowe et al., which is commonly assigned, and the disclosure of which is hereby incorporated by reference herein in its entirety, depicts details of the imaging member 110 including the imaging member 110 being comprised of a re-imageable surface layer 110(a) formed over a structural mounting layer that may be, for example, a cylindrical core, or one or more structural layers over a cylindrical core.

The imaging member 110 is used to apply an ink image to an image receiving media substrate 114 at a transfer nip 112. The transfer nip 112 is formed by an impression roller 118, as part of an image transfer mechanism 160, exerting pressure in the direction of the imaging member 110. Image receiving medium substrate 114 includes, but is not limited to, any particular composition or form such as, for example, paper, plastic, folded paperboard, Kraft paper, clear substrates, metallic substrates or labels. The exemplary system 100 may be used for producing images on a wide variety of image receiving media substrates. The 714 Application also explains the wide latitude of marking (printing) materials that may be used.

The exemplary system 100 includes a dampening fluid system 120 generally comprising a series of rollers, which may be considered as dampening rollers or a dampening unit, for uniformly wetting the re-imageable surface of the imaging member 110 with dampening fluid. A purpose of the dampening fluid system 120 is to deliver a layer of dampening fluid, generally having a uniform and controlled thickness, to the re-imageable surface of the imaging member 110. It is known that a dampening fluid such as fountain solution may comprise mainly water optionally with small amounts of isopropyl alcohol or ethanol added to reduce surface tension as well as to lower evaporation energy necessary to support subsequent laser patterning, as will be described in greater detail below. Small amounts of certain surfactants may be added to the fountain solution as well. Alternatively, other suitable dampening fluids may be used to enhance the performance of ink based digital lithography systems. Exemplary dampening fluids include water, Novec 7600 (1,1,1,2,3,3-Hexafluoro-4-(1,1,2,3,3,3-hexafluoropropoxy)pentane), and D4 (octamethylcyclotetrasiloxane). Other suitable dampening fluids are disclosed, by way of example, in co-pending U.S. Pat. No. 9,592,699, the disclosure of which is hereby incorporated herein by reference in its entirety.

Once the dampening fluid is metered onto the re-imageable surface of the imaging member 110, a thickness of the dampening fluid may be measured using a sensor (not shown) that may provide feedback to control the metering of the dampening fluid onto the re-imageable surface of the imaging member 110 by the dampening fluid system 120.

After a precise and uniform amount of dampening fluid is provided by the dampening fluid system 120 on the re-imageable surface of the imaging member 110, an optical patterning subsystem 130 may be used to selectively form a latent image in the uniform dampening fluid layer by image-wise patterning the dampening fluid layer using, for example, laser energy. Typically, the dampening fluid will not absorb the optical energy (IR or visible) efficiently. The re-imageable surface of the imaging member 110 should ideally absorb most of the laser energy (visible or invisible such as IR) emitted from the optical patterning subsystem 130 close to the surface to minimize energy wasted in heating the dampening fluid and to minimize lateral spreading of heat in order to maintain a high spatial resolution capability. Alternatively, an appropriate radiation sensitive component may be added to the dampening fluid to aid in the absorption of the incident radiant laser energy. While the optical patterning subsystem 130 is described above as being a laser emitter, it should be understood that a variety of different systems may be used to deliver the optical energy to pattern the dampening fluid.

The mechanics at work in the patterning process undertaken by the optical patterning subsystem 130 of the exemplary system 100 are described in detail with reference to FIG. 5 in the 714 Application. Briefly, the application of optical patterning energy from the optical patterning subsystem 130 results in selective removal of portions of the layer of dampening fluid.

Following patterning of the dampening fluid layer by the optical patterning subsystem 130, the patterned layer over the re-imageable surface of the imaging member 110 is presented to an inker subsystem 140. The inker subsystem 140 is used to apply a uniform layer of ink over the layer of dampening fluid and the re-imageable surface layer of the imaging member 110. The inker subsystem 140 may use an anilox roller to meter an offset lithographic ink, such as the white ink compositions of the present disclosure, onto one or more ink forming rollers that are in contact with the re-imageable surface layer of the imaging member 110. Separately, the inker subsystem 140 may include other traditional elements such as a series of metering rollers to provide a precise feed rate of ink to the re-imageable surface. The inker subsystem 140 may deposit the ink to the pockets representing the imaged portions of the re-imageable surface, while ink on the unformatted portions of the dampening fluid will not adhere to those portions.

The cohesiveness and viscosity of the ink residing in the re-imageable layer of the imaging member 110 may be modified by a number of mechanisms. One such mechanism may involve the use of a rheology (complex viscoelastic modulus) control subsystem 150. The rheology control system 150 may form a partial crosslinking layer of the ink on the re-imageable surface to, for example, increase ink cohesive strength relative to the re-imageable surface layer. Curing mechanisms may include optical or photo curing, heat curing, drying, or various forms of chemical curing. Cooling may be used to modify rheology as well via multiple physical cooling mechanisms, as well as via chemical cooling.

The ink is then transferred from the re-imageable surface of the imaging member 110 to a substrate of image receiving medium 114 using a transfer subsystem 160. The transfer occurs as the substrate 114 is passed through a nip 112 between the imaging member 110 and an impression roller 118 such that the ink within the voids of the re-imageable surface of the imaging member 110 is brought into physical contact with the substrate 114. With the adhesion of the ink, such as the white ink of the present disclosure, having been modified by the rheology control system 150, modified adhesion of the ink causes the ink to adhere to the substrate 114 and to separate from the re-imageable surface of the imaging member 110. Careful control of the temperature and pressure conditions at the transfer nip 112 may allow transfer efficiencies for the ink, such as the white ink of the present disclosure, from the re-imageable surface of the imaging member 110 to the substrate 114 to exceed 95%. While it is possible that some dampening fluid may also wet substrate 114, the volume of such a dampening fluid may be minimal, and may rapidly evaporate or be absorbed by the substrate 114.

In certain offset lithographic systems, it should be recognized that an offset roller, not shown in FIG. 1, may first receive the ink image pattern and then transfer the ink image pattern to a substrate according to a known indirect transfer method.

Following the transfer of the majority of the ink to the substrate 114, any residual ink and/or residual dampening fluid may be removed from the re-imageable surface of the imaging member 110, typically without scraping or wearing that surface. An air knife may be employed to remove residual dampening fluid. It is anticipated, however, that some amount of ink residue may remain. Removal of such remaining ink residue may be accomplished through use of some form of cleaning subsystem 170. The 714 Application describes details of such a cleaning subsystem 170 including at least a first cleaning member such as a sticky or tacky member in physical contact with the re-imageable surface of the imaging member 110, the sticky or tacky member removing residual ink and any remaining small amounts of surfactant compounds from the dampening fluid of the re-imageable surface of the imaging member 110. The sticky or tacky member may then be brought into contact with a smooth roller to which residual ink may be transferred from the sticky or tacky member, the ink being subsequently stripped from the smooth roller by, for example, a doctor blade.

The 714 Application details other mechanisms by which cleaning of the re-imageable surface of the imaging member 110 may be facilitated. Regardless of the cleaning mechanism, however, cleaning of the residual ink and dampening fluid from the re-imageable surface of the imaging member 110 may be used to prevent ghosting in the system. Once cleaned, the re-imageable surface of the imaging member 110 is again presented to the dampening fluid system 120 by which a fresh layer of dampening fluid is supplied to the re-imageable surface of the imaging member 110, and the process is repeated.

In order to meet digital offset printing requirements, the ink desirably possesses many physical and chemical properties. The ink is desirably compatible with materials it is in contact with, including printing plate, fountain solution, and other cured or non-cured inks. It also desirably meets functional requirements of the sub-systems, including wetting and transfer properties. Transfer of the imaged inks is challenging, as the ink desirably possesses the combination of wetting and transfer traits, that is, the ink desirably at once wets the blanket material homogeneously, and transfers from the blanket to the substrate. Transfer of the image layer is desirably efficient, desirably at least as high as 90%, as the cleaning sub-station can only eliminate small amounts of residual ink. Any ink remaining on the blanket after cleaning can result in an unacceptable ghost image appearing in subsequent prints.

The present disclosure further provides a method of digital offset printing, which includes applying the ink composition of the present disclosure onto a re-imageable imaging member surface, the re-imageable imaging member having dampening fluid disposed thereon; forming an ink image; and transferring the ink image from the re-imageable surface of the imaging member to a printable substrate.

The ink composition in accordance with the present disclosure is not limited to use in digital offset printing. The ink composition disclosed herein may also be useful in conventional offset printing or hybrid conventional offset and digital offset printing systems. Nonetheless, the ink compositions of the present disclosure meet systems requirements that are unique to digital offset printing systems.

In embodiments, a process of digital offset printing herein comprises applying an ink composition onto a re-imageable imaging member surface at an ink take up temperature, the re-imageable imaging member having dampening fluid disposed thereon; forming an ink image; transferring the ink image from the re-imageable surface of the imaging member to a printable substrate at an ink transfer temperature; wherein the ink composition comprises: water; an optional co-solvent; an optional colorant; a sulfonated polyester; and an isoprene rubber. In embodiments, applying the ink composition comprises applying the ink composition using an anilox delivery system.

Any suitable substrate, recording sheet, or removable support, stage, platform, and the like, can be employed for depositing the ink compositions herein, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, glossy coated papers such as XEROX® Digital Color Gloss, Sappi Warren Papers LUSTROGLOSS®, and the like, transparency materials, fabrics, textile products, plastics, polymeric films, glass, glass plate, inorganic substrates such as metals and wood, as well as meltable or dissolvable substrates, such as waxes or salts, in the case of removable supports for free standing objects, and the like. In certain embodiments, the substrate is selected from the group consisting of paper, plastic, folded paperboard, Kraft paper, and metal. In a specific embodiments, the substrate is a label. The label can be selected from any of the aforementioned types of substrate. In embodiments, the substrate comprises food packaging, medicinal packaging, and the like. In certain embodiments, the ink compositions herein form an undercoat. In embodiments, the substrate comprises a three-dimensional substrate. In embodiments, the substrate comprises medical devices such as catheters, thermometers, cardiac stents, programmable pace makers, other medical devices, menus, food packaging materials, cosmetic tools and products, and any other desired three-dimensional substrate. In further embodiments, the substrate comprises customizable digitally printed ID codes, short-run printable materials three-dimensional medical and any other desired three-dimensional substrate.

In embodiments, the ink composition herein has the characteristics of providing substantially 100 percent transfer from the re-imageable imaging member surface to the printable substrate.

In this specification and the claims that follow, singular forms such as "a," "an," and "the" include plural forms unless the content clearly dictates otherwise. All ranges disclosed herein include, unless specifically indicated, all endpoints and intermediate values.

The recitations of numerical ranges disclosed herein includes disclosure of all subranges included within the broader range (e.g., 1 to 5 discloses 1 to 4, 1 to 3, 1 to 2, 2 to 4, 2 to 3, . . . etc.).

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Preparation of a Sulfopolyester in Accordance with the Present Invention

A 5 gallon Parr reactor equipped with a mechanical stirrer, distillation apparatus and bottom drain valve was charged with dimethyl terephthalate (3.5 Kg), dimethyl-5-sulfo-isophthalate sodium salt (940 g), 1,2-propanediol (2.9 Kg), diethylene glycol (449 g) and buylstannoic acid (FASCAT® 4100 obtained from PMC Organometallix™) (7.2 g). The mixture was heated under nitrogen flow (3 SCFH, standard cubic feet per minute) to 120° C., after which stirring at 50 rpm was initiated. Subsequently, the mixture was heated at a rate of 0.5° C. per min for the next two hours until a temperature of 180° C. was attained, during which the methanol byproduct was collected in the distillation receiver. The mixture was then continued to be heated, and at a rate of 0.25° C. per min, until a temperature of 210° C. was attained, during which both methanol and excess 1,2-propanediol was collected in the distillation receiver. Subsequently, a vacuum was applied gradually until a pressure of 4.4 mm-Hg was attained at 210° C. over a one-hour period. The mixture was re-pressurized to atmospheric pressure with nitrogen, and the content was discharged through the bottom drain into a container. The product was allowed to cool to room temperature overnight, followed by granulation using a fitz-mill. The resulting product exhibited an onset glass transition temperature of 55.4° C., number average molecular weight of 1,326 g/mole, a weight average molecular weight of 2,350 g/mole, and a softening point of 135.9° C.

Example 2

Formation of Ink in Accordance with the Present Invention (Including Sulfonated Polyester with 7.5% Sulfonation and PUD)

Figure 3:
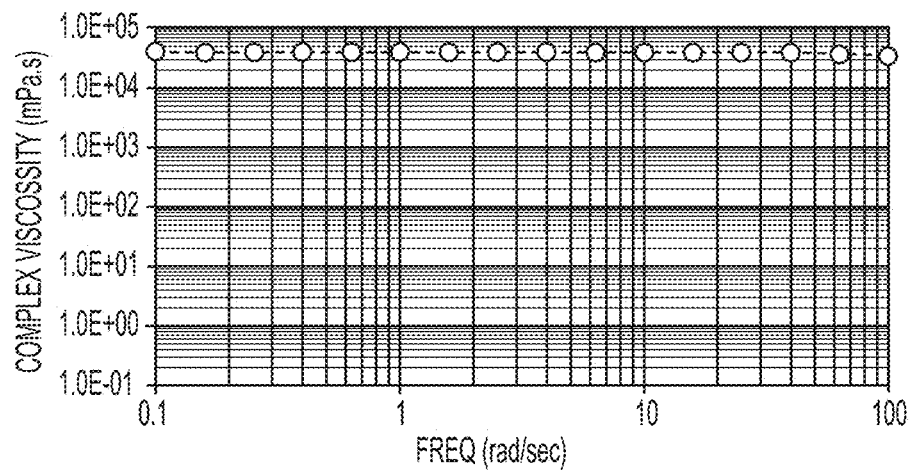
FIG. 3 is a graph showing complex viscosity (y-axis, mPas) versus frequency (x-axis, rad/sec) for an ink in accordance with one embodiment of the present disclosure.

Sulfolane and water were combined in a 150 mL beaker heated with fabric heating mantle (85° C.). The mixture was heated to 85° C. with stirring at 500 rpm. Sulfonated polyester was then added to the resulting mixture over 15 minutes, and continued to be stirred at about 85° C. for 30 minutes. Heating was removed but stirring continued until at about 30° C. Polyurethane dispersion (U XP 2698 obtained from Covestro) was then added dropwise to the stirring mixture, and continued to be stirred at –30° C. for an additional 30 minutes. The ink was characterized via viscosity, rollout (Brayer roller test) and lithographic offset print testing. The viscosity of the ink is shown in FIG. 3.

Example 3

Formation of Ink in Accordance with the Present Invention (Including Sulfonated Polyester with 7.5% Sulfonation and PUD without the Present of a Co-Solvent)

Figure 4:
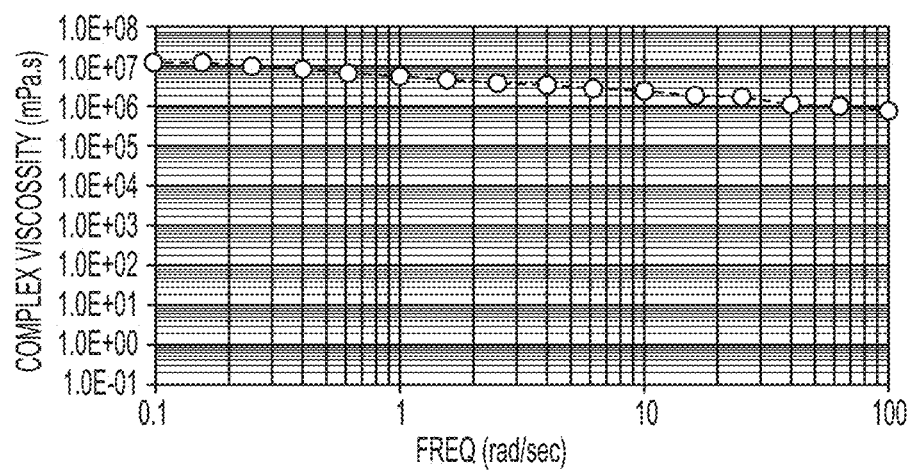
FIG. 4 is a graph showing complex viscosity (y-axis, mPas) versus frequency (x-axis, rad/sec) for an ink in accordance with one embodiment of the present disclosure.

Water was added to a 150 mL beaker heated with fabric heating mantle (85° C.) and heated to 85° C. with stirring at 500 rpm. Sulfonated polyester was then added to the resulting mixture over 15 minutes, and continued to be stirred at about 85° C. for 30 minutes. Heating was removed and the mixture was allowed to cool down with stirring continued until at about 30° C. Next, polyurethane dispersion (U XP 2698 obtained from Covestro) was then added dropwise to the stirring mixture, and continued to be stirred at –30° C. for an additional 30 minutes. The ink was characterized via viscosity, rollout (Brayer roller test) and lithographic offset print testing. The viscosity of the ink is shown in FIG. 4.

The weight percent of the ink components prepared in Examples 2 and 3 was summarized in Table 1 below:

TABLE 1

Components of a sulfonated polyester ink

|  | Example 2 | | Example 3 | |
| --- | --- | --- | --- | --- |
|  | Weight Percent | Mass (grams) | Weight Percent | Mass (grams) |
| Sulfonated polyester (7.5% sulfonation) | 40.0% | 32 | 40.0% | 40 |
| sulfolane | 20.0% | 16 | 0 | 0 |
| water | 35% | 28 | 35% | 35 |
| PUD | 5% | 4 | 25% | 25 |
| TOTAL | 100% | 80 | 100% | 100 |

Example 4

Testing of Clear Adhesive Inks as an Adhesive

Figure 5A:
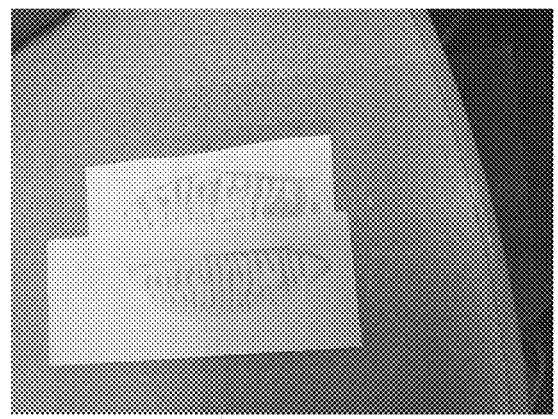
FIG. 5A is an image of plain sheets coated with inks in accordance with the present embodiments and subsequently rolled onto a substrate.
Figure 5B:
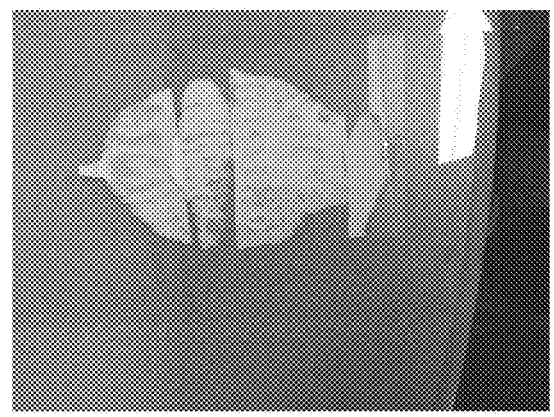
FIG. 5B is an image of the portion of the plaint sheets coated with inks in accordance with the present embodiments being adhered onto the substrate after attempt to peel off from the substrate.
Figure 5C:
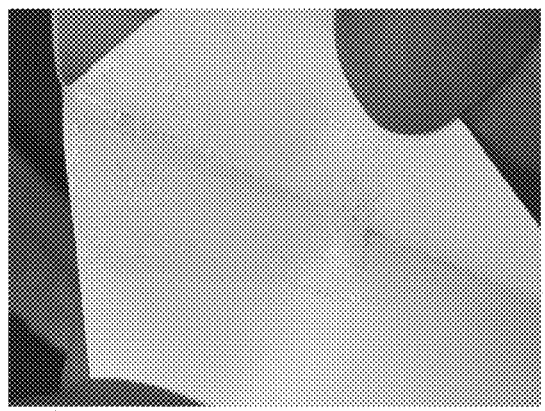
FIG. 5C is an image of two pieces of plaint sheets stuck together with ink in accordance with the present embodiments.

A layer of ink was spread onto a substrate Mylar sheet (which is a standard plastic transparency sheet containing PET, polyethylene terephthalate) using a wooden spatula to create a uniform film. Next, a piece of plain paper was rolled down onto the Mylar sheet. FIG. 5A shows the image of plain paper pressed onto the ink (or adhesive ink). Immediately afterwards, the "rolled-on" piece of plain paper was then attempted to be peeled away from the Mylar sheet by hand. FIG. 5B shows the image of the left behind portion of the paper after removal. FIG. 5C shows the image of peeling two pieces of paper that were rolled together with the adhesive ink in between. The image shows the adhesive property between the two pieces of paper.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. An ink composition comprising:
   water;
   an optional co-solvent;
   a sulfonated polyester having a degree of sulfonation of from about 3.5 mole percent to about 7.5 mole percent; and
   a polyurethane dispersion, and wherein the sulfonated polyester comprises a terephthalate-diol unit, a sulfonated terephthalate-diol unit and a crosslinker unit having the following structures:

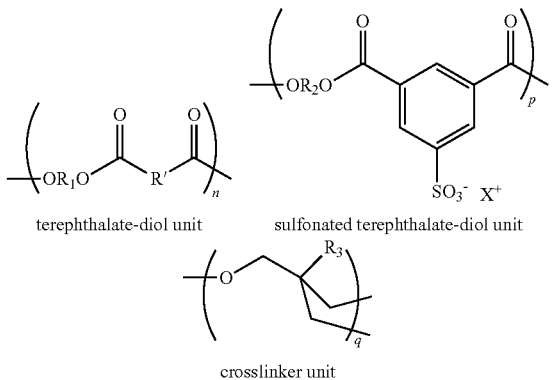

terephthalate-diol unit    sulfonated terephthalate-diol unit crosslinker unit wherein
   each $R_1$ and each $R_2$ is independently an alkylene of from 2 to about 25 carbon atoms;
   each $R_3$ is independently a branched or unbranched alkyl group of from 1 to 15 carbon atoms;
   each R' is independently an arylene of from about 6 to about 36 carbon atoms;
   each $X^+$ is independently $Na^+$, Li+, or K+;
   n is from about 40 to about 48 mole percent;
   p is from about 7.5 to about 15 mole percent; and
   q is from about 0.1 to about 2.5 mole percent.

2. The ink composition of claim 1, wherein the sulfonated polyester comprises a branched polymer.

3. The ink composition of claim 1, wherein the sulfonated polyester comprises a linear polymer.

4. The ink composition of claim 1, wherein the sulfonated polyester comprises a sodium sulfonated polyester.

5. The ink composition of claim 1, wherein the sulfonated polyester comprises a polyol monomer unit selected from the group consisting of trimethylolpropane, 1,2-propanediol, diethylene glycol, and combinations thereof; and
   further wherein the sulfonated polyester comprises a diacid monomer unit selected from the group consisting of terephthalic acid, sulfonated isophthalic acid, and combinations thereof.

6. The ink composition of claim 1, wherein the sulfonated polyester is water-dissipatible.

7. The ink composition of claim 1, wherein the sulfonated polyester is present in the ink composition in an amount of from about 10 to about 60 percent by weight based upon the total weight of the ink composition.

8. The ink composition of claim 1, wherein the polyurethane dispersion is present in the ink composition in an amount of from about 2 to about 40 percent by weight based upon the total weight of the ink composition.

9. The ink composition of claim 1, wherein water is present in the ink composition in an amount of from about 55 to about 85 percent by weight based upon the total weight of the ink composition.

10. The ink composition of claim 1, wherein the co-solvent is selected from the group consisting of ethylene glycol, diethylene glycol, N-methylpyrrolidone, methoxylated glycerol, ethoxylated glycerol, sulfolane, methyl ethyl ketone, isopropanol, 2-pyrrolidinone, polyethylene glycol, and mixtures thereof.

11. The ink composition of claim 1, wherein the co-solvent is present in the ink composition in an amount of from about 0 to about 40 percent by weight based upon the total weight of the ink composition.

12. The ink composition of claim 1, wherein the water to co-solvent ratio is from about 100:0 to about 30:70.

13. The ink composition of claim 1, wherein the ink composition further comprises a surfactant.

14. The ink composition of claim 1, wherein the ink composition is substantially free of pigment.

15. The ink composition of claim 1, wherein the ink exhibits a viscosity of from about 2 to about 100 cps at 25° C.

16. A process for digital offset printing, the process comprising:
applying an ink composition onto a re-imageable imaging member surface at an ink take up temperature, the re-imageable imaging member having dampening fluid disposed thereon;
forming an ink image; and
transferring the ink image from the re-imageable surface of the imaging member to a printable substrate at an ink transfer temperature;
wherein the ink composition comprises:
water;
an optional co-solvent;
a sulfonated polyester having a degree of sulfonation of from about 3.5 mole percent to about 7.5 mole percent; and
a polyurethane dispersion, and wherein the sulfonated polyester comprises a terephthalate-diol unit, a sulfonated terephthalate-diol unit and a crosslinker unit having the following structures:

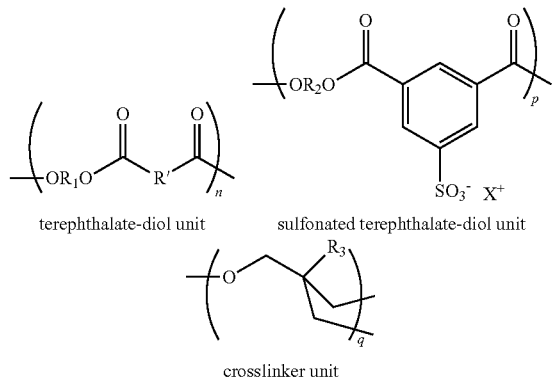

terephthalate-diol unit     sulfonated terephthalate-diol unit crosslinker unit wherein
each $R_1$ and each $R_2$ is independently an alkylene of from 2 to about 25 carbon atoms;
each $R_3$ is independently a branched or unbranched alkyl group of from 1 to 15 carbon atoms;
each R' is independently an arylene of from about 6 to about 36 carbon atoms;
each $X^+$ is independently $Na^+$, $Li+$, or $K+$;
n is from about 40 to about 48 mole percent;
p is from about 7.5 to about 15 mole percent; and
q is from about 0.1 to about 2.5 mole percent.

17. The process of claim 16, wherein the ink composition is substantially free of pigment.

* * * * *